(12) United States Patent
Dong et al.

(10) Patent No.: US 10,748,166 B2
(45) Date of Patent: Aug. 18, 2020

(54) METHOD AND SYSTEM FOR MINING CHURN FACTOR CAUSING USER CHURN FOR NETWORK APPLICATION

(71) Applicant: TENCENT TECHNOLOGY (SHENZHEN) COMPANY LIMITED, Shenzhen (CN)

(72) Inventors: Jie Dong, Shenzhen (CN); Xiao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 974 days.

(21) Appl. No.: 15/200,718

(22) Filed: Jul. 1, 2016

(65) Prior Publication Data
US 2016/0314484 A1 Oct. 27, 2016

Related U.S. Application Data

(63) Continuation of application No. PCT/CN2015/077082, filed on Apr. 21, 2015.

(30) Foreign Application Priority Data

Apr. 23, 2014 (CN) .......................... 2014 1 0165863

(51) Int. Cl.
*G06F 30/00* (2020.01)
*G06Q 30/02* (2012.01)
(Continued)

(52) U.S. Cl.
CPC ..... *G06Q 30/0204* (2013.01); *G06F 16/2465* (2019.01); *G06F 16/24578* (2019.01); *G06F 16/285* (2019.01)

(58) Field of Classification Search
CPC combination set(s) only.
See application file for complete search history.

(56) References Cited

U.S. PATENT DOCUMENTS

| | | | |
|---|---|---|---|
| 7,110,998 B1 * | 9/2006 | Bhandari | ............ G06F 16/2465 |
| 2007/0156673 A1 * | 7/2007 | Maga | ..................... G06Q 30/02 |

(Continued)

FOREIGN PATENT DOCUMENTS

| | | |
|---|---|---|
| CN | 102567807 A | 7/2012 |
| CN | 102955894 A | 3/2013 |
| EP | 1811445 A1 | 7/2007 |

OTHER PUBLICATIONS

Bracher; Churn Risk Scoring Using Call Network Analysis; IEEE ICDE Conference 2015; pp. 1400-1403; 2015.*

(Continued)

*Primary Examiner* — Radu Andrei
(74) *Attorney, Agent, or Firm* — Anova Law Group, PLLC

(57) ABSTRACT

A method for mining a churn factor causing user churn for a network application includes: calculating, according to a data universe of churned users, a proportion of a quantity of churned users under each user operation scenario where user churn occurs for a network application in a total quantity of the churned users, and determining multiple user operation scenarios corresponding to multiple proportions sequentially placed in foremost positions in a list of all calculated proportions of user operation scenarios ranked in a descending order; determining churn factors of the multiple user operation scenarios; determining, according to the proportions of the churned users under the multiple user operation scenarios in all the churned users, influence weight values of the churn factors; and determining, when the influence (Continued)

weight value of a churn factor is greater than or equal to the threshold, that the churn factor is a major churn factor.

18 Claims, 5 Drawing Sheets

(51) Int. Cl.
*G06F 16/28* (2019.01)
*G06F 16/2458* (2019.01)
*G06F 16/2457* (2019.01)

(56) References Cited

U.S. PATENT DOCUMENTS

| | | | | |
|---|---|---|---|---|
| 2008/0166050 | A1* | 7/2008 | Yeh | G06K 9/00805 |
| | | | | 382/190 |
| 2009/0292583 | A1* | 11/2009 | Eilam | G06Q 30/0224 |
| | | | | 705/7.31 |
| 2012/0047219 | A1* | 2/2012 | Feng | G06F 16/2465 |
| | | | | 709/207 |
| 2012/0053990 | A1* | 3/2012 | Pereg | G06Q 40/02 |
| | | | | 705/7.31 |
| 2013/0054306 | A1* | 2/2013 | Bhalla | G06Q 30/02 |
| | | | | 705/7.31 |
| 2013/0138474 | A1* | 5/2013 | Dorai | G06Q 10/00 |
| | | | | 705/7.28 |
| 2013/0185245 | A1* | 7/2013 | Anderson | G06Q 50/00 |
| | | | | 706/52 |
| 2014/0012887 | A1* | 1/2014 | Tamano | G06F 16/182 |
| | | | | 707/827 |
| 2014/0114722 | A1* | 4/2014 | Mohan | G06Q 30/0201 |
| | | | | 705/7.29 |
| 2014/0119522 | A1* | 5/2014 | Phadke | H04M 15/58 |
| | | | | 379/133 |
| 2014/0244664 | A1* | 8/2014 | Verma | G06Q 30/0251 |
| | | | | 707/749 |
| 2014/0274382 | A1* | 9/2014 | Green | G07F 17/3274 |
| | | | | 463/31 |
| 2014/0278779 | A1* | 9/2014 | Maga | G06Q 10/06375 |
| | | | | 705/7.31 |
| 2014/0297580 | A1* | 10/2014 | Javarappa | G06F 16/00 |
| | | | | 706/52 |
| 2015/0302019 | A1* | 10/2015 | Takeda | G06F 16/243 |
| | | | | 707/724 |
| 2016/0217216 | A1* | 7/2016 | Baird | G06Q 10/10 |
| 2016/0217425 | A1* | 7/2016 | Baird | G06Q 10/1053 |
| 2016/0253688 | A1* | 9/2016 | Nielsen | G06F 16/337 |
| | | | | 705/7.31 |
| 2016/0314484 | A1* | 10/2016 | Dong | G06F 16/2465 |

OTHER PUBLICATIONS

Gruszczynski; Improve Effectivenss in Churn Modelling; IEEE CASoN 2011; pp. 217-222; 2011.*
The World Intellectual Property Organization (WIPO) International Search Report for PCT/CN2015/077082 dated Jul. 17, 2015 p. 1-3.
Yan, Peng. "Data analysis of new user churn on the first day for online games" http://www.yanpeng.info/159.html, Nov. 16, 2013. The second table and the context.
Xu,Yi. "Data-driven mobile game optimization and players churn instance analysis" http://www.laohu.com/20130817307.html, Aug. 3, 2013 The whole document.
The State Intellectual Property Office of the People's Republic of China (SIPO) Office Action 1 for 201410165863.4 dated Sep. 18, 2018 7 Pages (including translation).
Juan Wang: "Loss analysis and research of YL unicorn", China excellent master's dissertation full text database economics and management science. Mar. 15, 2011, The entire passage. 49 Pages.
Yan, Peng. "Data analysis of new user churn on the first day for online games", http://www.yanpeng.info/159.html, Nov. 16, 2013. The second table and the context 10 Pages (including translation).
Xu,Yi. "Data-driven mobile game optimization and players churn instance analysis", http://www.laohu.com/201308/7307.html, Aug. 3, 2013 The whole document 11 Pages (including translation).

* cited by examiner

METHOD AND SYSTEM FOR MINING CHURN FACTOR CAUSING USER CHURN FOR NETWORK APPLICATION

CROSS-REFERENCES TO RELATED APPLICATIONS

This application is a continuation application of PCT Patent Application No. PCT/CN2015/077082, filed on Apr. 21, 2015, which claims priority to Chinese Patent Application No. 201410165863.4, entitled "METHOD AND SYSTEM FOR MINING CHURN FACTOR CAUSING USER CHURN FOR NETWORK APPLICATION" filed on Apr. 23, 2014, the entire contents of both of which are incorporated herein by reference.

FIELD OF THE INVENTION

The present disclosure relates to the field of Internet technologies, and in particular, to a method and a system for mining a churn factor causing user churn for a network application.

BACKGROUND OF THE INVENTION

In related technologies, mining of churned users in novices of a network application may be performed on the basis of a logistic regression algorithm in Statistical Product and Service Solutions (SPSS) tools. The solution is applicable to a group of samples of a known type. Several churn related factors are retrieved according to expert experience, a 1/0 (churn/non-churn) classification model (that is, a regression equation) is obtained through monitoring and learning of training samples, the classification model is then used to predict a churn probability of each user, and a risk feature that clearly affects user churn may be obtained by using a regression coefficient of each churn related factor.

However, in related technologies, stream data cannot be used to perform learning and modeling, and generally it is required that a sample is static data. Therefore, in an existing mining solution, usually only network application experience that affects user churn on a macro level can be found.

In addition, in related technologies, it is required that churn related features are independent of each other, so as to avoid problems such as a distortion and a high error code rate in model estimation because a multiple collinearity problem occurs. Therefore, before modeling, dimensionality reduction processing usually needs to be performed on features first. However, new feature vectors after dimensionality reduction are located in a new feature space and original meanings may be lost. Therefore, even if a churn related feature vector is found in a final result, a specific function or experience corresponding to the found feature vector cannot be found to make a corresponding optimization and improvement.

SUMMARY

A first aspect of an embodiment of the present invention discloses a method for mining a churn factor causing user churn for a network application. The method includes: calculating, according to a data set of churned users, a proportion of a quantity of churned users under each user operation scenario where user churn occurs for the network application in a total quantity of the churned users, and determining multiple user operation scenarios corresponding to multiple proportions sequentially placed in foremost positions in a list of all calculated proportions of user operation scenarios ranked in a descending order; determining churn factors of the multiple user operation scenarios, each of the multiple user operation scenarios is associated with at least one churn factor; determining, according to the proportions of the churned users under the multiple user operation scenarios to which the churn factors belong in all the churned users, influence weight values of the churn factors; and when an influence weight value of a churn factor is greater than or equal to a threshold, determining, if the influence weight value of the churn factor is greater than or equal to the threshold, that the churn factor is a major churn factor.

A second aspect of an embodiment of the present invention discloses a system for mining a churn factor causing user churn for a network application. The system includes: a scenario determining module, configured to calculate, according to a data set of churned users, a proportion of a quantity of churned users under each user operation scenario where user churn occurs for the network application in a total quantity of the churned users, and determine multiple user operation scenarios corresponding to multiple proportions sequentially placed in foremost positions in a list of all calculated proportions ranked in a descending order; a churn factor analysis module, configured to analyze churn factors of the multiple user operation scenarios determined by the scenario determining module, each of the multiple user operation scenarios is associated with at least one churn factor; an influence calculation module, configured to determine, according to the proportions of the churned users under the multiple user operation scenarios to which the churn factors obtained by the churn factor analysis module belong in all the churned users, influence weight values of the churn factors; and a major churn factor determining module, configured to determine whether an influence weight value of a churn factor obtained through calculation by the influence calculation module is greater than or equal to a threshold, and determine, if the influence weight value of the churn factor is greater than or equal to the threshold, that the churn factor is a major churn factor.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present disclosure.

The method as disclosed as following may be implemented by any appropriate computing device having one or more processors and memory. The computing device, used herein, may refer to any appropriate device with certain computing capabilities (e.g., of controlling media data to be placed at a constant speed), such as a personal computer (PC), a work station computer, a hand-held computing device (tablet), a mobile terminal (a mobile phone or a smart phone), a server, a network server, a smart terminal, or any other user-side or server-side computing device. The memory includes storage medium, which may further include memory modules, e.g., Read-Only Memory (ROM), Random Access Memory (RAM), and flash memory modules, and mass storages, e.g., CD-ROM, U-disk, removable hard disk, etc., which are all non-transitory storage medium. The storage medium may store computer programs for implementing various processes, when executed by the processors.

A method and a system for mining a churn factor causing user churn for a network application are disclosed in embodiments of the present invention. Clustering analysis can be performed on users on the basis of stream data of a network application, so as to mine detailed problems in specific aspects such as design defects of submodules of a network application. Detailed description is provided below with reference to the embodiments.

Figure 1:
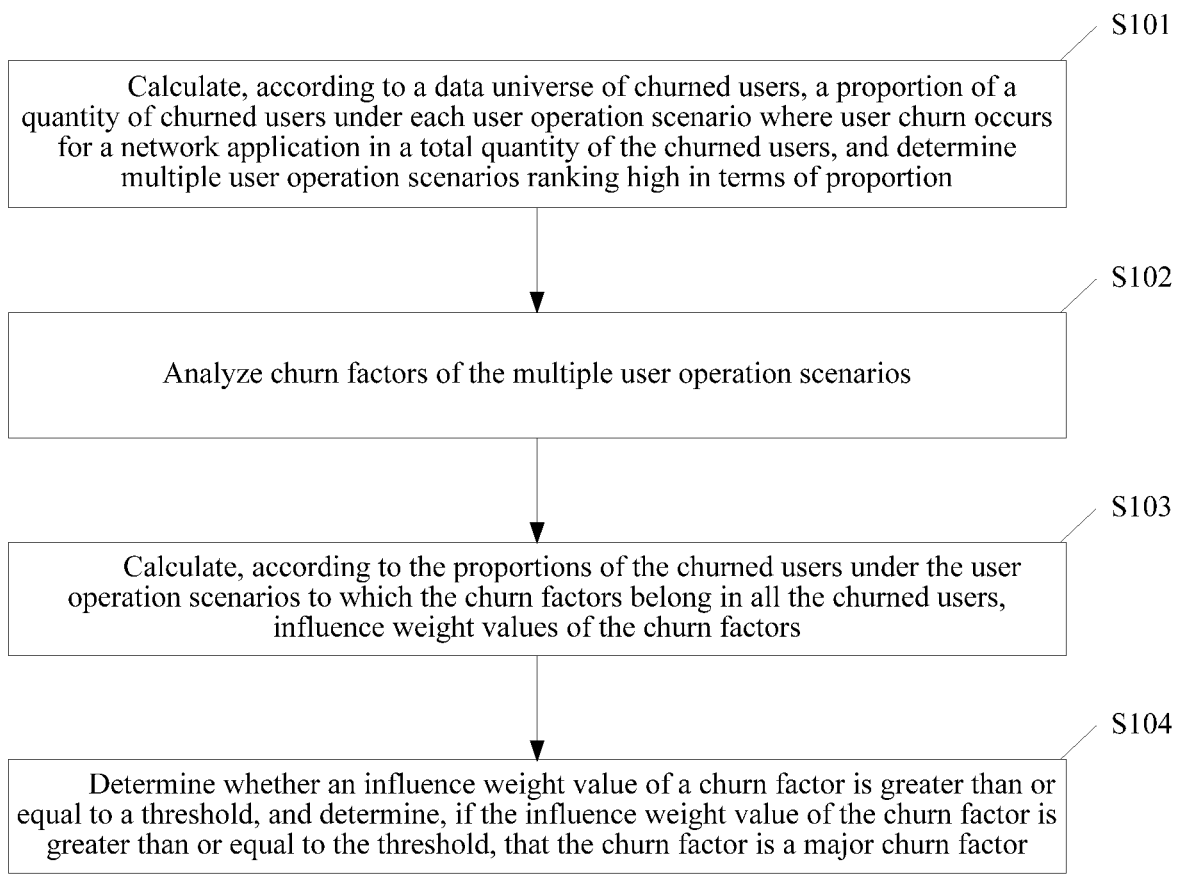
FIG. 1 is a flowchart of a method for mining a churn factor causing user churn for a network application disclosed in an embodiment of the present invention.

Please refer to FIG. 1, which is a flowchart of a method for mining a churn factor causing user churn for a network application disclosed in an embodiment of the present invention. As shown in FIG. 1, the method for mining a churn factor causing user churn for a network application may include the following steps.

S101: Calculating, according to a data universe of churned users, a proportion of a quantity of churned users under each user operation scenario where user churn occurs for a network application in a total quantity of the churned users, and determine multiple user operation scenarios ranking high in terms of proportion. The user operation scenario may also be referred to as user scenario. In some embodiments, the computing device may acquire both data universes of churned users and non-churned users. A churned user may refer to a user that has not been active with the network application for a certain time period and/or a user terminal that uninstalled the network application.

A data universe of a user, as used herein, may refer to a data set containing all collected information of the user when executing the network application. The collected information may include, for example, user operation scenarios, user operation logs such as records of items that the user engaged in the network application. In a gaming application, a user may conduct actions in various game maps under different user operation scenarios (e.g., game mode). The dataset of the user may include map types played by the user, map experience numbers played by the user, kill/death (KD) ratio of the user, map failure rates of the various maps, map interruption rates of the various maps, map average battle time of the various maps, etc. When the data universe of all churned users are acquired, the computing device may perform statistical analysis on the complete dataset, such as, counting quantity of churned users under each user operation scenarios, counting quantity of churned users played a specific map, etc.

In the embodiment of the present invention, the data universe of the churned users may be first categorized into different data types according to different user operation scenarios, a proportion of the quantity of churned users under each user operation scenario in the total quantity of the churned users is then calculated according to each categorized data type, and finally the multiple user operation scenarios ranking high in terms of proportion may be determined according to the calculated proportion of the quantity of churned users under each user operation scenario in the total quantity of the churned users.

As used herein, multiple user operation scenarios ranking high in terms of proportion may refer to multiple user operation scenarios corresponding to multiple proportions sequentially placed in foremost positions in a list of all calculated proportions of user operation scenarios ranked in a descending order. For example, the values of the proportions of the quantities of the churned users under the user operation scenarios in the total quantity of the churned users may be first arranged in a descending order, the proportions of the quantities of the churned users under the user operation scenarios in the total quantity of the churned users are then added one by one according to the descending order, and a sum of the proportions of the quantities of the churned users under the multiple user operation scenarios that are finally determined and to be analyzed in the total quantity of the churned users is greater than or equal to a predetermined value. The predetermined value here may be, for example, 50% to 70%. In an actual application, the multiple user operation scenarios to be analyzed may be determined by using the following formula:

$$X \leq \text{Sum}(\text{Top1\_Rate} + \text{Top2\_Rate} + \ldots + \text{TopN\_Rate}) \qquad (1)$$

where X in Formula (1) is the predetermined value, and TopN_Rate represents a proportion of a quantity of churned users under a user operation scenario that ranks the Nth in terms of the quantity of churned users in the total quantity of the churned users.

When the value of X is 50%, because the most focused first 50% of user operation scenarios are selected, the covered churned users are certainly most representative. For example, the total sum of the TOP1 to TOP13 user scenario types occupies the first 50%, and the total sum of the following 200 multiple user scenario types occupies the last 50%. The following user scenario types meet the long tail, and mining of root causes of churn and optimization for these user types in the long tail have low input/output ratios. Therefore, mining of root causes of churn and optimization only need to be performed on user operation scenarios that have high clustering and have high proportions of churned users. In addition, the user operation scenarios here may be, for example, different gaming modes in online games.

S102: Analyzing churn factors of the multiple user operation scenarios.

In the embodiment of the present invention, user-frequently used maps of the multiple user operation scenarios determined in step S101 may be determined first. Further, the user-frequently used maps of the user operation scenarios may be determined one by one. When a user-frequently used map of a user operation scenario is determined, the proportion of the quantity of churned users of each map type under the user operation scenario in the total quantity of the churned users under the user operation scenario may be calculated, and the multiple map types ranking high in terms of proportion may then be determined according to the calculated proportion of the quantity of churned users of each map type in the total quantity of churned users under the user operation scenario. The multiple map types are the user-frequently used maps.

As used herein, multiple map types ranking high in terms of proportion may refer to multiple map types corresponding to multiple proportions sequentially placed in foremost positions in a list of all calculated proportions of map types ranked in a descending order. For example, the values of the proportions of the quantities of the churned users under the map types in the total quantity of the churned users under the user operation scenario may be first arranged in a descending order, the proportions of the quantities of the churned users under the map types in the total quantities of the churned users are then added one by one according to the descending order, and a sum of the proportions of the quantities of the churned users under the multiple map types that are finally determined and to be analyzed in the total quantities of the churned users is greater than or equal to a preset value. The preset value here may be, for example, 50% to 70%. In an actual application, the multiple map types to be analyzed may be determined by using the following formula:

$$Y \leq \text{Sum(proportion of map type 1+proportion of map type 2+ ... +proportion of map type } N) \quad (2)$$

where Y in Formula (2) is a preset value, and proportion of map type N represents a proportion of a quantity of churned users of a map type that ranks the Nth in terms of the quantity of churned users in the total quantity of the churned users under the user operation scenario.

After the user-frequently used maps of the multiple user operation scenarios determined in step S101 are determined, a statistical value of a feature affecting user churn of each user-frequently used map may be acquired. For example, a statistical value of a feature affecting user churn of each user-frequently used map may be acquired from a pre-established feature base of churn factors. Because many possible features affect user churn in an online game, and churn factors affecting user churn in different games also change dynamically in different stages, it needs to be automatically analyzed whether a different feature in a game is a churn factor. To improve computation efficiency of automatic mining of a churn factor of a user, a possible feature base of churn factors may be pre-established. The churn factors in the feature base may include, for example, a map type, a map experience number, a kill/death (KD) ratio, a map failure rate, a map interruption rate, and a map average battle time. Meanwhile, a relational database of a map type and a feature type of the map type may also be pre-established. These features constitute a feature node of a decision tree for analyzing a churn factor of each user operation scenario.

After the statistical value of the feature affecting user churn of each user-frequently used map of the multiple user operation scenarios is obtained, the statistical values of these features may be compared with a baseline value of a corresponding feature in a feature baseline model of non-churned users in the map. It should be noted that data of non-churned users may be first used to obtain average data of each feature of each map for the non-churned users, and a map feature baseline model of the non-churned users in these maps is generated through automatic learning. If a fluctuation rate of an obtained statistical value of the feature affecting user churn relative to a baseline value of a corresponding feature in the map feature baseline model of the non-churned users is greater than or equal to a preset value, it may be determined that the feature is a churn factor. Further, when a fluctuation rate of a statistical value of a feature affecting user churn relative to a baseline value of the map feature baseline model of the non-churned users is greater than 30%, a label of a churn factor may be put on the feature, and when the fluctuation rate is greater than 90%, a label of a high factor of churn may be put on the feature.

S103: Calculating, according to the proportions of the churned users under the user operation scenarios to which the churn factors belong in all the churned users, influence weight values of the churn factors. In other words, an influence weight value of a churn factor is determined based on a proportion of a quantity of churned users under one or more user operation scenarios associated with the churn factor in the total quantity of the churned users.

In the embodiment of the present invention, if a same churn factor exists in at least two of the determined multiple user scenarios to be analyzed. For example, a churn factor on a low novice map KD ratio exists in a plurality of user scenarios, the proportions of the churned users under the plurality of user scenarios to which each churn factor in the same churn factor under the plurality of user scenarios belongs in all the churned users may be added, to obtain an influence weight value of the same churn factor. In other words, the proportions of the churned users under each of the at least two of the multiple user operation scenarios in all the churned users are added to obtain the influence weight value of the churn factor.

For example, if a churn factor of a low novice map KD exists in all of user operation scenario 1, user operation scenario 2, and user operation scenario 3, a proportion of churned users of user operation scenario 1 in all the churned users is 30%, a proportion of churned users of user operation scenario 2 in all the churned users is 15%, and a proportion of churned users of user operation scenario 3 in all the churned users is 5%, an influence weight value of the churn factor of a low novice map KD ratio is a value obtained after adding the proportion of the churned users of user operation scenario 1 in all the churned users, the proportion of the churned users of user operation scenario 2 in all the churned users, and the proportion of the churned users of user operation scenario 3 in all the churned users, that is, 30%+15%+5%, equal to 50%. For another example, a churn factor of a high map failure rate exists in both user-frequently used map 1 and user-frequently used map 3 of user operation scenario 1, and a churn factor of a high map failure rate also exists in user-frequently used map 2 of user operation scenario 3, so that an influence weight value of the churn factor of a high map failure rate is 30%+30%+5%, equal to 65%.

In addition, if a churn factor exists uniquely in the determined multiple user scenarios to be analyzed, a proportion of churned users under a user scenario to which the churn factor that exists uniquely belongs in all the churned users may be determined as an influence weight value of the churn factor that exists uniquely. In other words, if the churn factor exists under a unique one of the multiple user operation scenarios, a proportion of churned users under the unique one of the multiple user operation scenarios in all the churned users is determined as an influence weight value of the churn factor. For example, a churn factor of a small map experience number exists only in user operation scenario 1, a churn factor of a small map experience number does not exist under other user operation scenarios, and a proportion of churned users of user operation scenario 1 in all the churned users is 30%, so that the influence weight value of the churn factor is 30%.

S104: Determining whether an influence weight value of a churn factor is greater than or equal to a threshold, and determining, if the influence weight value of the churn factor is greater than or equal to the threshold, that the churn factor is a major churn factor.

In the embodiment of the present invention, it may be determined one by one whether the influence weight values of the churn factors obtained through calculation in step S103 are greater than or equal to the threshold. If an influence weight value of a churn factor is greater than or equal to the threshold, it may be determined that the churn factor is a major churn factor. The threshold of the influence weight value here may be, for example, 40%.

In the method for mining a churn factor causing user churn for a network application provided in FIG. 1, multiple user operation scenarios having most churned users may be determined according to a data universe of churned users, churn factors of the multiple user operation scenarios are analyzed, influence weight values of the churn factors are calculated according to proportions of churned users under the user operation scenarios to which the churn factors belong in all the churned users, it is determined whether an influence weight value of a churn factor is greater than or equal to a threshold, and if an influence weight value of a churn factor is greater than or equal to the threshold, it is determined that the churn factor is a major churn factor. Therefore, clustering analysis may be performed on users on the basis of stream data of a network application, and such clustering analysis of specific operation scenarios for users can mine detailed problems in specific aspects such as design defects of submodules of a network application.

Figure 2:
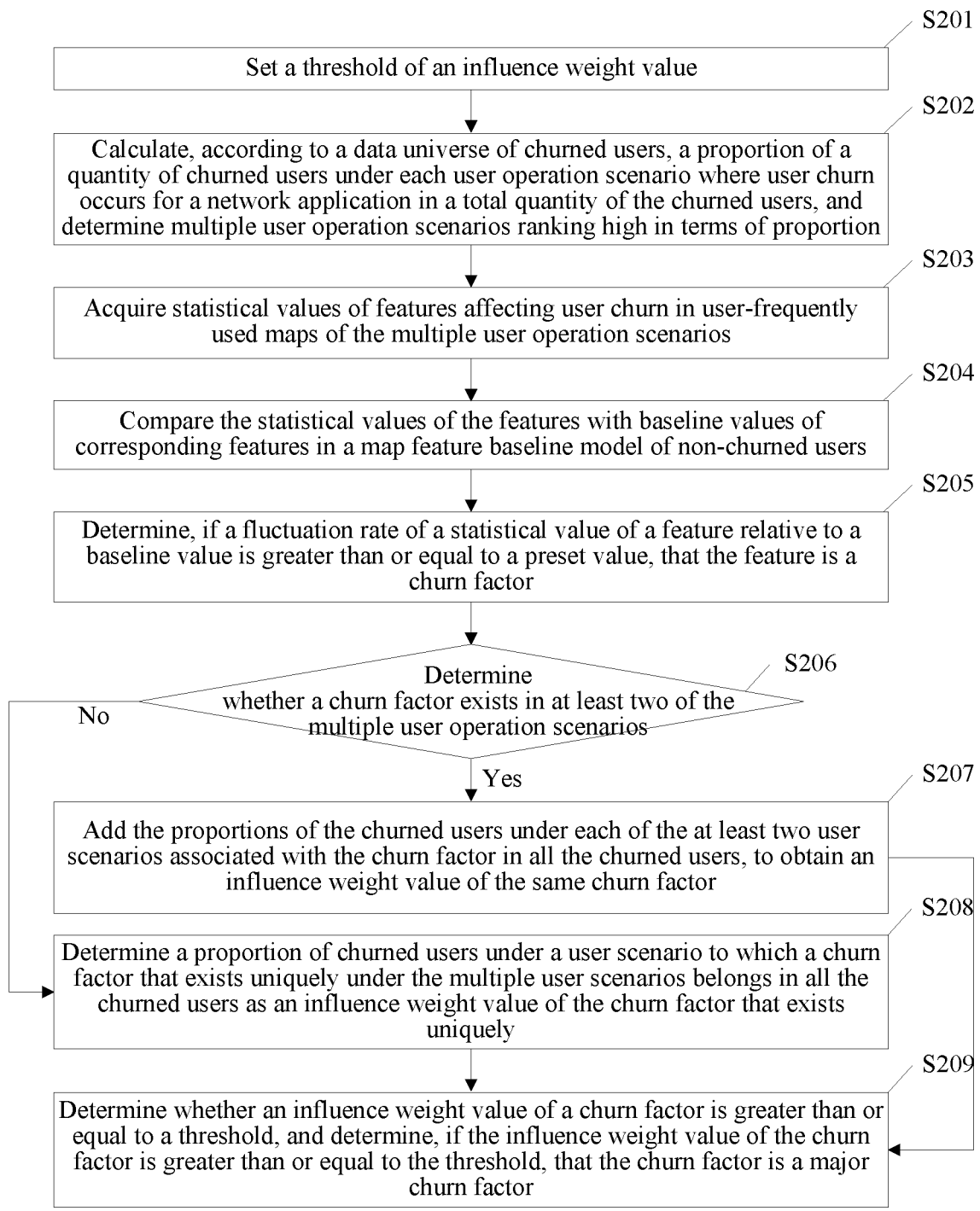
FIG. 2 is a flowchart of another method for mining a churn factor causing user churn for a network application disclosed in an embodiment of the present invention.

Please refer to FIG. 2, which is a flowchart of another method for mining a churn factor causing user churn for a network application provided in an embodiment of the present invention. As shown in FIG. 2, the method for mining a churn factor causing user churn for a network application may include the following steps:

S201: Setting a threshold of an influence weight value.

Specifically, a threshold of an influence weight value of a churn factor may be preset, and the threshold of the influence weight value may be, for example, 40%.

S202: Calculating, according to a data universe of churned users, a proportion of a quantity of churned users under each user operation scenario where user churn occurs for a network application in a total quantity of the churned users, and determining multiple user operation scenarios ranking high in terms of proportion.

Specifically, the data universe of the churned users may be first categorized into different data types according to different user operation scenarios, a proportion of the quantity of churned users under each user operation scenario in the total quantity of the churned users is then calculated according to each categorized data type, and finally the multiple user operation scenarios ranking high in terms of proportion may be determined according to the calculated proportion of the quantity of churned users under each user operation scenario in the total quantity of the churned users. For example, the values of the proportions of the quantities of the churned users under the user operation scenarios in the total quantity of the churned users may be first arranged in a descending order, and the proportions of the quantities of the churned users under the user operation scenarios in the total quantity of the churned users are then added one by one according to the descending order, and a sum of the proportions of the quantities of the churned users under the multiple user operation scenarios that are finally determined and to be analyzed in the total quantity of the churned users is greater than or equal to a predetermined value. The predetermined value here may be, for example, 50% to 70%. In an actual application, the multiple user operation scenarios to be analyzed may be determined by using the following formula:

$$X \leq \mathrm{Sum}(\mathrm{Top1\_Rate} + \mathrm{Top2\_Rate} + \ldots + \mathrm{Top}N\_\mathrm{Rate}) \quad (1)$$

where X in Formula (1) is the predetermined value, and TopN_Rate represents a proportion of a quantity of churned users under a user operation scenario that ranks the Nth in terms of the quantity of churned users in the total quantity of the churned users.

When the value of X is 50%, because the most focused first 50% of user operation scenarios are selected, the covered churned users are certainly most representative. For example, the total sum of the TOP1 to TOP13 user scenario types occupies the first 50%, and the total sum of the following 200 multiple user scenario types occupies the last 50%. The following user scenario types meet the long tail, and mining of root causes of churn and optimization for these user types in the long tail have low input/output ratios. Therefore, mining of root causes of churn and optimization only need to be performed on user operation scenarios that have high clustering and have high proportions of churned users.

S203: Acquiring statistical values of features affecting user churn in user-frequently used maps of the multiple user operation scenarios.

Specifically, the user-frequently used maps of the multiple user operation scenarios determined in step S202 may be determined first. Further, the user-frequently used maps of the user operation scenarios may be determined one by one. When a user-frequently used map of a user operation scenario is determined, the proportion of the quantity of churned users of each map type under the user operation scenario in the total quantity of the churned users under the user operation scenario may be calculated, and the multiple map types ranking high in terms of proportion may then be determined according to the calculated proportion of the quantity of churned users of each map type in the total quantity of churned users under the user operation scenario. For example, the values of the proportions of the quantities of the churned users under the map types in the total quantity of the churned users under the user operation scenario may be first arranged in a descending order, and the proportions of the quantities of the churned users under the map types in the total quantities of the churned users are then added one by one according to the descending order, and a sum of the proportions of the quantities of the churned users under the multiple map types that are finally determined and to be analyzed in the total quantities of the churned users is greater than or equal to a preset value. The preset value here may be, for example, 50% to 70%. The multiple map types to be analyzed may be determined by using the following formula:

$$Y \leq \text{Sum}(\text{proportion of map type 1} + \text{proportion of map type 2} + \ldots + \text{proportion of map type } N) \quad (2)$$

where Y in Formula (2) is a preset value, and proportion of map type N represents a proportion of a quantity of churned users of a map type that ranks the Nth in terms of the quantity of churned users in the total quantity of the churned users under the user operation scenario.

After the user-frequently used maps of the multiple user operation scenarios determined in step S202 are determined, a statistical value of a feature affecting user churn of each user-frequently used map may be acquired. For example, a statistical value of a feature possibly affecting user churn of each user-frequently used map may be acquired from a pre-established feature base of churn factors. Because many possible features affect user churn in an online game, and churn factors affecting user churn in different games also change dynamically in different stages, it needs to be automatically analyzed whether a different feature in a game is a churn factor. To improve computation efficiency of automatic mining of a churn factor of a user, a possible feature base of churn factors may be pre-established. The churn factors in the feature base may include, for example, a map type, a map experience number, a kill/death (KD) ratio, a map failure rate, a map interruption rate, and a map average battle time. Meanwhile, a relational database of a map type and a feature type of the map type may also be pre-established. These features constitute a feature node of a decision tree for analyzing a churn factor of each user operation scenario.

S204: Comparing the statistical values of the features with a baseline value of a corresponding feature in a map feature baseline model of non-churned users.

Specifically, data of a non-churned user may be first used to obtain average data of each feature of each map of a non-churned user, and a map feature baseline model of non-churned users is generated through automatic learning. If a fluctuation rate of a statistical value of a feature affecting user churn obtained through analysis relative to a baseline value of a corresponding feature in the map feature baseline model of the non-churned users is greater than or equal to a preset value, it may be determined that the feature is a churn factor.

S205: Determining, if a fluctuation rate of a statistical value of a feature relative to a baseline value is greater than or equal to a preset value, that the feature is a churn factor.

Specifically, when a fluctuation rate of a statistical value of a feature affecting user churn relative to a baseline value of the map feature baseline model for the non-churned users is greater than 30%, a label of a churn factor may be put on the feature, and when the fluctuation rate is greater than 90%, a label of a high factor of churn may be put on the feature.

S206: Determining whether a same churn factor exists in the multiple user operation scenarios.

Specifically, it may be determined whether a same churn factor exists in at least two of the multiple user operation scenarios determined in step S202. For example, a churn factor on a high map interruption rate exists in user operation scenario 1, user operation scenario 2, and user operation scenario 4. If it is determined that a same churn factor exists in at least two user operation scenarios, the procedure turns to step S207; or if it is determined that a same churn factor exist under only one of the multiple user operation scenarios, the procedure turns to step S208.

S207: Adding the proportions of the churned users under the user scenarios to which each churn factor in the same churn factor under the multiple user scenarios belongs in all the churned users, to obtain an influence weight value of the same churn factor. In other words, the proportions of the churned users under each of the at least two of the multiple user operation scenarios in all the churned users are added to obtain the influence weight value of the churn factor.

Specifically, for example, if a churn factor of a low novice map KD exists in all of user operation scenario 1, user operation scenario 2, and user operation scenario 3, a proportion of churned users of user operation scenario 1 in all the churned users is 30%, a proportion of churned users of user operation scenario 2 in all the churned users is 15%, and a proportion of churned users of user operation scenario 3 in all the churned users is 5%, an influence weight value of the churn factor of a low novice map KD ratio is a value obtained after adding the proportion of the churned users of user operation scenario 1 in all the churned users, the proportion of the churned users of user operation scenario 2 in all the churned users, and the proportion of the churned users of user operation scenario 3 in all the churned users, that is, 30%+15%+5%, equal to 50%. For another example, a churn factor of a high map failure rate exists in both user-frequently used map 1 and user-frequently used map 3 of user operation scenario 1, and a churn factor of a high map failure rate also exists in user-frequently used map 2 of user operation scenario 3, so that an influence weight value of the churn factor of a high map failure rate is 30%+30%+5%, equal to 65%.

S208: Determining a proportion of churned users under a user scenario to which a churn factor that exists uniquely under the multiple user scenarios belongs in all the churned users as an influence weight value of the churn factor that exists uniquely. In other words, if the churn factor exists under a unique one of the multiple user operation scenarios, a proportion of churned users under the unique one of the multiple user operation scenarios in all the churned users is determined as an influence weight value of the churn factor.

Specifically, for example, a churn factor of a small map experience number exists only in user operation scenario 1, a churn factor of a small map experience number does not exist under other user operation scenarios, and a proportion of churned users of user operation scenario 1 in all the churned users is 30%, so that the influence weight value of the churn factor is 30%.

S209: Determining whether an influence weight value of a churn factor is greater than or equal to a threshold, and determining, if the influence weight value of the churn factor is greater than or equal to the threshold, that the churn factor is a major churn factor.

Specifically, it may be determined one by one whether the influence weight values of the churn factors obtained through calculation in steps S207 and S208 are greater than or equal to the threshold. If an influence weight value of a churn factor is greater than or equal to the threshold, it may be determined that the churn factor is a major churn factor. The threshold of the influence weight value here may be a value preset in step S201, for example, the value is 40%.

In the method for mining a churn factor causing user churn for a network application provided in FIG. 2, related features of user-frequently used maps of major operation scenarios where user churn occurs may be analyzed, to determine related churn factors, and proportions of churned users under user scenarios to which each churn factor in a same churn factor belongs in all the churned users are added, to obtain an influence weight value of the churn factor, so as to determine a final major churn factor. Therefore, clustering analysis may be performed on users on the basis of stream data and log data of a network application. Such clustering analysis of specific operation scenarios for users can mine detailed problems in specific aspects such as design defects of submodules of a network application, and a concept of a meta-algorithm such as boosting is applied in the process of clustering analysis, so that the speed and accuracy of mining a churn factor causing user churn for a network application may be greatly improved.

To better understand the method for mining a churn factor causing user churn for a network application provided in the embodiment of the present invention, the description is provided below with reference to the massive online game CrossFire (CF).

First, several user operation scenarios, for example, Biochemical Mode and Challenge Mode, where a severest user churn phenomenon occurs are determined according to a data universe of churned users of the game CF. Next, user-frequently used maps under the user operation scenarios, that is, Biochemical Mode and Challenge Mode may be found through analysis. For example, it is found through analysis that a frequently used map in Biochemical Mode is Bio Arena and a frequently used map in Challenge Mode is BL Camp. After it is found through analysis that Bio Arena and BL Camp are frequently used maps, statistical values of features affecting user churn of the two maps may be acquired. For example, statistical values of three features, that is, a map interruption rate, a map average battle time, and a KD ratio in the map Bio Arena are acquired, and statistical values of two features, that is, a map interruption rate and a map failure rate of BL Camp are acquired. After the statistical values of these features are acquired, the statistical values of the features may be compared with baseline values of corresponding features in a map feature baseline model of non-churned users. If a fluctuation rate of a statistical value of a feature relative to a baseline value is greater than or equal to a preset value, it may be determined that the feature is a churn factor. For example, when the statistical value of map interruption rate of the map Bio Arena is 60%, the baseline value of the same feature in the map feature baseline model is 30%, and the preset value is 30%, the fluctuation rate is greater than the preset value, thus the map interruption rate of the map Bio Arena can be determined as a churn factor.

For example, it is determined that the two features, that is, the map interruption rate and the map average battle time of the map Bio Arena are the churn factors, and the two features, that is, the map interruption rate and the map failure rate, of the map BL Camp are churn factors. After churn factors of frequently used maps of multiple user operation scenarios where a severest user churn phenomenon occurs are determined, proportions of churned users under user scenarios to which each churn factor belongs in a same churn factor under the multiple user scenarios in all churned users are added, to obtain an influence weight value of the same churn factor. For example, the churn factor, that is, the map interruption rate exists in both Bio Arena and BL Camp, it is assumed that a proportion of churned users of an operation scenario of Biochemical Mode to which Bio Arena belongs in all churned users is 30%, and it is assumed that a proportion of churned users of an operation scenario of Challenge Mode to which BL Camp belongs in all churned users is 40%, so that an influence weight value of the churn factor of the map interruption rate is equal to 70% (that is, 30% plus 40%). At the same time, it may be determined that a proportion of churned users under a user scenario to which a churn factor that exists uniquely under the multiple user scenarios belongs in all the churned users as an influence weight value of the churn factor that exists uniquely. For example, it may be obtained that an influence weight value of the churn factor, that is, the map average battle time is 30%, and an influence weight value of the churn factor of the map failure rate is 40%. Finally, if the influence weight value (70%) of the churn factor, that is, the map interruption rate is greater than or equal to a threshold (for example, 60%), it may be determined that the map interruption rate is a major churn factor of the game CF.

Figure 3:
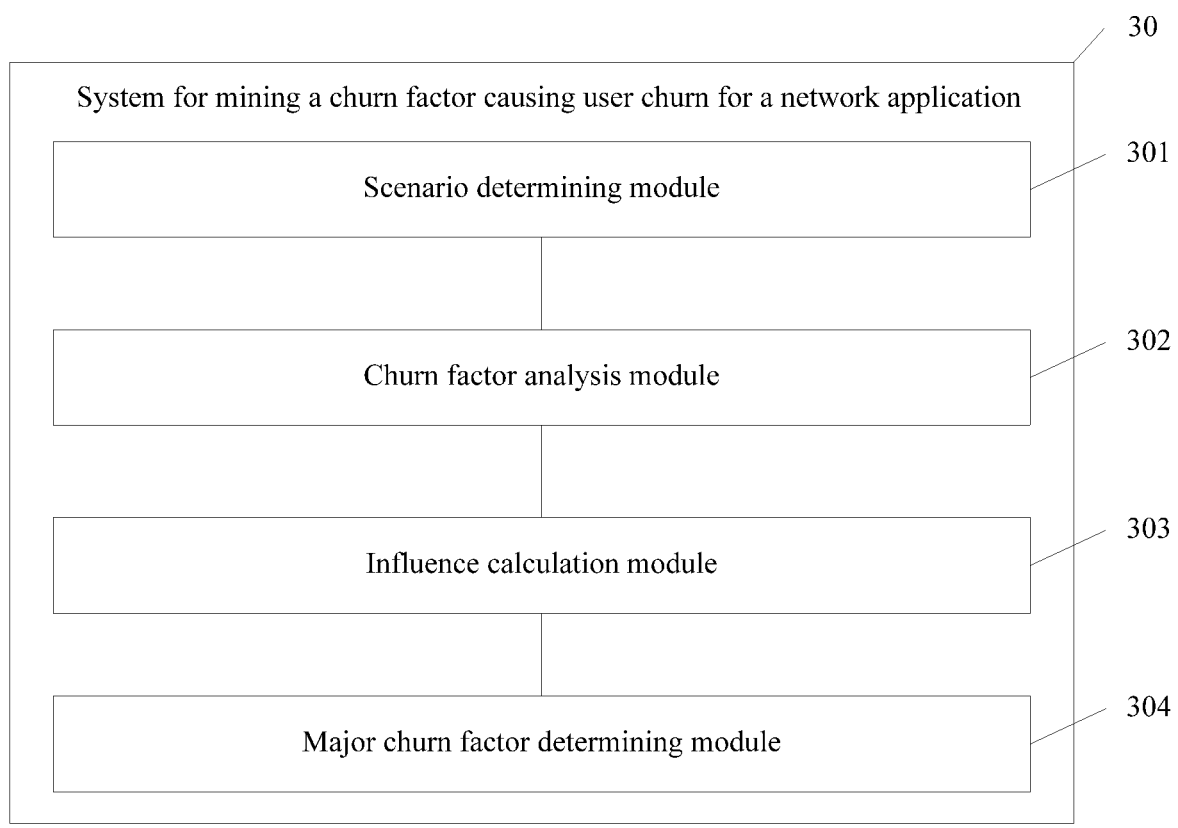
FIG. 3 is a schematic structural diagram of a system for mining a churn factor causing user churn for a network application disclosed in an embodiment of the present invention.

Please refer to FIG. 3, which is a schematic structural diagram of a system for mining a churn factor causing user churn for a network application provided in an embodiment of the present invention. As shown in FIG. 3, the system 30 for mining a churn factor causing user churn for a network application may include multiple instruction modules that can be executed by a computer processor, and the multiple instruction modules include: a scenario determining module 301, a churn factor analysis module 302, an influence calculation module 303, and a major churn factor determining module 304.

The scenario determining module 301 is configured to calculate, according to a data universe of churned users, a proportion of a quantity of churned users under each user operation scenario where user churn occurs for a network application in a total quantity of the churned users, and determine multiple user operation scenarios ranking high in terms of proportion. Specifically, the data universe of the churned users may be first categorized into different data types according to different user operation scenarios, a proportion of the quantity of churned users under each user operation scenario in the total quantity of the churned users is then calculated according to each categorized data type, and finally the multiple user operation scenarios ranking high in terms of proportion may be determined according to the calculated proportion of the quantity of churned users under each user operation scenario in the total quantity of the churned users. For example, the values of the proportions of the quantities of the churned users under the user operation scenarios in the total quantity of the churned users may be first arranged in a descending order, and the proportions of the quantities of the churned users under the user operation scenarios in the total quantity of the churned users are then added one by one according to the descending order, and a sum of the proportions of the quantities of the churned users under the multiple user operation scenarios that are finally determined and to be analyzed in the total quantity of the churned users is greater than or equal to a predetermined value. The predetermined value here may be, for example, 50% to 70%. The multiple user operation scenarios to be analyzed may be determined by using the following formula:

$$X \leq \text{Sum}(\text{Top1\_Rate} + \text{Top2\_Rate} + \ldots + \text{Top}N\_\text{Rate}) \quad (1)$$

where X in Formula (1) is the predetermined value, and TopN_Rate represents a proportion of a quantity of churned users under a user operation scenario that ranks the Nth in terms of the quantity of churned users in the total quantity of the churned users.

When the value of X is 50%, because the most focused first 50% of user operation scenarios are selected, the covered churned users are certainly most representative. For example, the total sum of the TOP1 to TOP13 user scenario types occupies the first 50%, and the total sum of the following 200 multiple user scenario types occupies the last 50%. The following user scenario types meet the long tail, and mining of root causes of churn and optimization for these user types in the long tail have low input/output ratios. Therefore, mining of root causes of churn and optimization only need to be performed on user operation scenarios that have high clustering and have high proportions of churned users.

The churn factor analysis module 302 is configured to analyze churn factors of the multiple user operation scenarios determined by the scenario determining module 301. Specifically, user-frequently used maps of multiple user operation scenarios determined by the scenario determining module 301 may be determined first. Further, the user-frequently used maps of the user operation scenarios may be determined one by one. When a user-frequently used map of a user operation scenario is determined, the proportion of the quantity of churned users of each map type under the user operation scenario in the total quantity of the churned users under the user operation scenario may be calculated, and the multiple map types ranking high in terms of proportion may then be determined according to the calculated proportion of the quantity of churned users of each map type in the total quantity of churned users under the user operation scenario. The multiple map types are the user-frequently used maps. For example, the values of the proportions of the quantities of the churned users under the map types in the total quantity of the churned users under the user operation scenario may be first arranged in a descending order, the proportions of the quantities of the churned users under the map types in the total quantities of the churned users are then added one by one according to the descending order, and a sum of the proportions of the quantities of the churned users under the multiple map types that are finally determined and to be analyzed in the total quantities of the churned users is greater than or equal to a preset value. The preset value here may be, for example, 50% to 70%. The multiple map types to be analyzed may be determined by using the following formula:

$$Y \leq \text{Sum(proportion of map type 1+proportion of map type 2+ ... +proportion of map type } N) \quad (2)$$

where Y in Formula (2) is a preset value, and proportion of map type N represents a proportion of a quantity of churned users of a map type that ranks the Nth in terms of the quantity of churned users in the total quantity of the churned users under the user operation scenario.

After the user-frequently used maps of the multiple user operation scenarios determined by the scenario determining module 301 are determined, a statistical value of a feature affecting user churn of each user-frequently used map may be acquired. For example, a statistical value of a feature affecting user churn of each user-frequently used map may be acquired from a pre-established feature base of churn factors. Because many possible features affect user churn in an online game, and churn factors affecting user churn in different games also change dynamically in different stages, it needs to be automatically analyzed whether a different feature in a game is a churn factor. To improve computation efficiency of automatic mining of a churn factor of a user, a possible feature base of churn factors may be pre-established. The churn factors in the feature base may include, for example, a map type, a map experience number, a kill/death (KD) ratio, a map failure rate, a map interruption rate, and a map average battle time. Meanwhile, a relational database of a map type and a feature type of the map type may also be pre-established. These features constitute a feature node of a decision tree for analyzing a churn factor of each user operation scenario.

After the statistical value of the feature affecting user churn of each user-frequently used map of the multiple user operation scenarios is obtained through analysis, the statistical values of these features may be compared with a baseline value of a corresponding feature in a map feature baseline model of non-churned users. It should be noted that data of non-churned users may be first used to obtain average data of each feature of each map for the non-churned users, and a map feature baseline model of non-churned users is generated through automatic learning. If a fluctuation rate of a statistical value of a feature affecting user churn obtained through analysis relative to a baseline value of a corresponding feature in the map feature baseline model of the non-churned users is greater than or equal to a preset value, it may be determined that the feature is a churn factor. Further, when a fluctuation rate of a statistical value of a feature affecting user churn relative to a baseline value of the map feature baseline model of the non-churned users is greater than 30%, a label of a churn factor may be put on the feature, and when the fluctuation rate is greater than 90%, a label of a high factor of churn may be put on the feature.

The influence calculation module 303 is configured to calculate, according to the proportions of the churned users under the user operation scenarios to which the churn factors obtained by the churn factor analysis module 302 belong in all the churned users, influence weight values of churn factors. Specifically, if a same churn factor exists under at least two of the multiple user scenarios that are determined by the scenario determining module 301 and are to be analyzed. For example, a churn factor of a low novice map KD ratio exists in three of the multiple user scenarios, the proportions of the churned users under the these three user scenarios in all the churned users may be added, to obtain an influence weight value of the same churn factor.

For example, if a churn factor of a low novice map KD exists in all of user operation scenario 1, user operation scenario 2, and user operation scenario 3, a proportion of churned users of user operation scenario 1 in all the churned users is 30%, a proportion of churned users of user operation scenario 2 in all the churned users is 15%, and a proportion of churned users of user operation scenario 3 in all the churned users is 5%, an influence weight value of the churn factor of a low novice map KD ratio is a value obtained after adding the proportion of the churned users of user operation scenario 1 in all the churned users, the proportion of the churned users of user operation scenario 2 in all the churned users, and the proportion of the churned users of user operation scenario 3 in all the churned users, that is, 30%+15%+5%, equal to 50%. For another example, a churn factor of a high map failure rate exists in both user-frequently used map 1 and user-frequently used map 3 of user operation scenario 1, and a churn factor of a high map failure rate also exists in user-frequently used map 2 of user operation scenario 3, so that an influence weight value of the churn factor of a high map failure rate is 30%+30%+5%, equal to 65%.

In addition, if a churn factor exists uniquely under the multiple user scenarios that are determined by the scenario determining module 301 and are to be analyzed, the proportion of the churned users under a user scenario to which the churn factor that exists uniquely belongs in all the churned users may be determined as an influence weight value of the churn factor that exists uniquely. For example, a churn factor of a small map experience number exists only in user operation scenario 1, a churn factor of a small map experience number does not exist under other user operation scenarios, and a proportion of churned users of user operation scenario 1 in all the churned users is 30%, so that the influence weight value of the churn factor is 30%.

The major churn factor determining module 304 is configured to determine whether an influence weight value of a churn factor obtained through calculation by the influence calculation module 303 is greater than or equal to a threshold, and determine, if the influence weight value of the churn factor is greater than or equal to the threshold, that the churn factor is a major churn factor. Specifically, it may be determined one by one whether the influence weight values of the churn factors obtained through calculation by the influence calculation module 303 are greater than or equal to the threshold. If an influence weight value of a churn factor is greater than or equal to the threshold, it may be determined that the churn factor is a major churn factor. The threshold of the influence weight value here may be, for example, 40%.

In the system for mining a churn factor causing user churn for a network application provided in FIG. 3, multiple user operation scenarios having most churned users may be determined according to a data universe of churned users, churn factors of the multiple user operation scenarios are analyzed, influence weight values of the churn factors are calculated according to proportions of churned users under the user operation scenarios to which the churn factors belong in all the churned users, it is determined whether an influence weight value of a churn factor is greater than or equal to a threshold, and if an influence weight value of a churn factor is greater than or equal to the threshold, it is determined that the churn factor is a major churn factor. Therefore, clustering analysis may be performed on users on the basis of stream data of a network application, and such clustering analysis of specific operation scenarios for users can mine detailed problems in specific aspects such as design defects of submodules of a network application.

Figure 4:
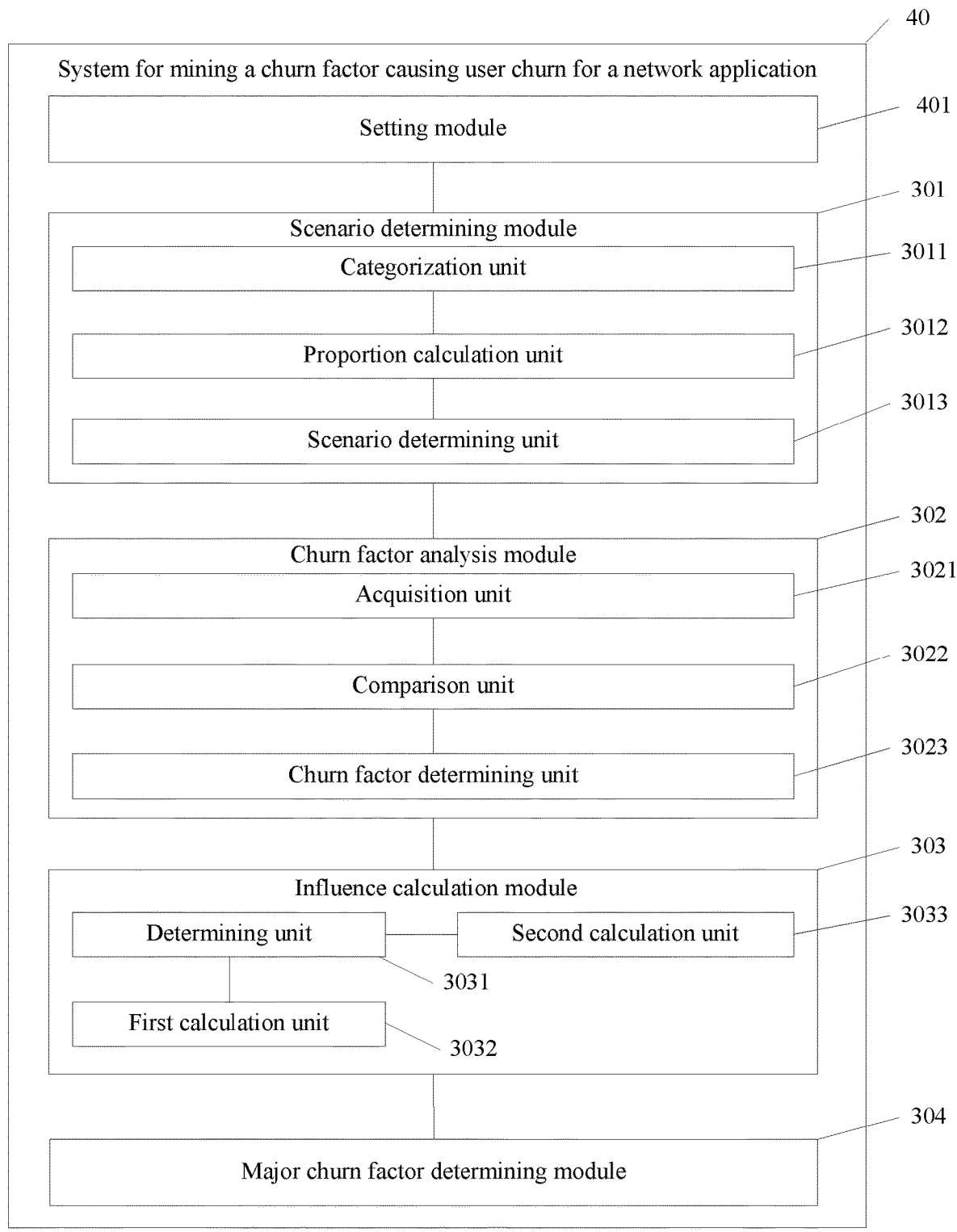
FIG. 4 is a schematic structural diagram of another system for mining a churn factor causing user churn for a network application disclosed in an embodiment of the present invention.

Please refer to FIG. 4, which is a schematic structural diagram of another system for mining a churn factor causing user churn for a network application provided in an embodiment of the present invention. The system 40 for mining a churn factor causing user churn for a network application shown in FIG. 4 is obtained through optimization of the system 30 for mining a churn factor causing user churn for a network application shown in FIG. 3. The system 40 for mining a churn factor causing user churn for a network application shown in FIG. 4 further includes a setting module 401. The scenario determining module 301 may further include a categorization unit 3011, a proportion calculation unit 3012, and a scenario determining unit 3013. The churn factor analysis module 302 may further include an acquisition unit 3021, a comparison unit 3022, and a churn factor determining unit 3023. The influence calculation module 303 may further include a determining unit 3031, a first calculation unit 3032, and a second calculation unit 3033.

The setting module 401 is configured to set a threshold of an influence weight value of a churn factor. Specifically, a threshold of an influence weight value of a churn factor may be preset, and the threshold of the influence weight value may be, for example, 40%.

The categorization unit 3011 in the scenario determining module 301 is configured to categorize a data universe of churned users into different data types according to different user operation scenarios. Specifically, the user operation scenarios here may be, for example, different gaming modes in online games.

The proportion calculation unit 3012 is configured to calculate, according to a data type categorized by the categorization unit 3011, a proportion of the quantity of churned users under each user operation scenario in the total quantity of churned users.

The scenario determining unit 3013 is configured to determine, according to the proportion of the quantity of churned users under each user operation scenario obtained through calculation by the proportion calculation unit in the total quantity of churned users, multiple user operation scenarios ranking high in terms of proportion. Here the proportions of the quantities of the churned users under the multiple user scenarios in the total quantity of churned users are less than or equal to a predetermined value. For example, the values of the proportions of the quantities of the churned users under the user operation scenarios in the total quantity of the churned users may be first arranged in a descending order, and the proportions of the quantities of the churned users under the user operation scenarios in the total quantity of the churned users are then added one by one according to the descending order, and a sum of the proportions of the quantities of the churned users under the multiple user operation scenarios that are finally determined and to be analyzed in the total quantity of the churned users is greater than or equal to a predetermined value. The predetermined value here may be, for example, 50% to 70%. the multiple user operation scenarios to be analyzed may be determined by using the following formula:

$$X \leq \text{Sum}(\text{Top1\_Rate} + \text{Top2\_Rate} + \ldots + \text{TopN\_Rate}) \qquad (1)$$

where X in Formula (1) is the predetermined value, and TopN_Rate represents a proportion of a quantity of churned users under a user operation scenario that ranks the Nth in terms of the quantity of churned users in the total quantity of the churned users.

When the value of X is 50%, because the most focused first 50% of user operation scenarios are selected, the covered churned users are certainly most representative. For example, the total sum of the TOP1 to TOP13 user scenario types occupies the first 50%, and the total sum of the following 200 multiple user scenario types occupies the last 50%. The following user scenario types meet the long tail, and mining of root causes of churn and optimization for these user types in the long tail have low input/output ratios. Therefore, mining of root causes of churn and optimization only need to be performed on user operation scenarios that have high clustering and have high proportions of churned users.

The acquisition unit 3021 in the churn factor analysis module 302 is configured to acquire statistical values of features affecting user churn of user-frequently used maps of the multiple user operation scenarios determined by the scenario determining module 301. Specifically, the user-frequently used maps of the multiple user operation scenarios determined by the scenario determining module 301 may be determined first. Further, the user-frequently used maps of the user operation scenarios may be determined one by one. When a user-frequently used map of a user operation scenario is determined, the proportion of the quantity of churned users of each map type under the user operation scenario in the total quantity of the churned users under the user operation scenario may be calculated, and the multiple map types ranking high in terms of proportion may then be determined according to the calculated proportion of the quantity of churned users of each map type in the total quantity of churned users under the user operation scenario. The multiple map types are the user-frequently used maps. For example, the values of the proportions of the quantities of the churned users under the map types in the total quantity of the churned users under the user operation scenario may be first arranged in a descending order, the proportions of the quantities of the churned users under the map types in the total quantities of the churned users are then added one by one according to the descending order, and a sum of the proportions of the quantities of the churned users under the multiple map types that are finally determined and to be analyzed in the total quantities of the churned users is greater than or equal to a preset value. The preset value here may be, for example, 50% to 70%. The multiple map types to be analyzed may be determined by using the following formula:

$$Y \leq \text{Sum(proportion of map type 1+proportion of map type 2+ ... +proportion of map type } N) \quad (2)$$

where Y in Formula (2) is a preset value, and proportion of map type N represents a proportion of a quantity of churned users of a map type that ranks the Nth in terms of the quantity of churned users in the total quantity of the churned users under the user operation scenario.

After the user-frequently used maps of the multiple user operation scenarios determined by the scenario determining module 301 are determined, a statistical value of a feature affecting user churn of each user-frequently used map may be acquired. For example, a statistical value of a feature possibly affecting user churn of each user-frequently used map may be acquired from a pre-established feature base of churn factors. Because many possible features affect user churn in an online game, and churn factors affecting user churn in different games also change dynamically in different stages, it needs to be automatically analyzed whether a different feature in a game is a churn factor. To improve computation efficiency of automatic mining of a churn factor of a user, a possible feature base of churn factors may be pre-established. The churn factors in the feature base may include, for example, a map type, a map experience number, a kill/death (KD) ratio, a map failure rate, a map interruption rate, and a map average battle time. Meanwhile, a relational database of a map type and a feature type of the map type may also be pre-established. These features constitute a feature node of a decision tree for analyzing a churn factor of each user operation scenario.

The comparison unit 3022 is configured to compare the statistical values of the features of the user-frequently used maps obtained by the feature analysis unit 3021 with baseline values of corresponding features in a map feature baseline model of non-churned users. Specifically, data of a non-churned user may be first used to obtain average data of each feature of each map of a non-churned user, and a map feature baseline model of non-churned users is generated through automatic learning. If a fluctuation rate of a statistical value of a feature affecting user churn obtained through analysis relative to a baseline value of a corresponding feature in the map feature baseline model of the non-churned users is greater than or equal to a preset value, it may be determined that the feature is a churn factor.

The churn factor determining unit 3023 is configured to determine, when the comparison unit 3022 finds through comparison that a fluctuation rate of a statistical value of a feature of a user-frequently used map relative to a baseline value is greater than or equal to a preset value, that the feature is a churn factor. Specifically, when a fluctuation rate of a statistical value of a feature, affecting user churn, of a user-frequently used map relative to a baseline value of the map feature baseline model for the non-churned users is greater than 30%, a label of a churn factor may be put on the feature, and when the fluctuation rate is greater than 90%, a label of a high factor of churn may be put on the feature.

The determining unit 3031 in the influence calculation module 303 is configured to determine whether a same churn factor exists under at least two of the multiple user scenarios determined by the scenario determining module 301. Specifically, the same churn factor here refers to that, for example, a churn factor on a high map interruption rate exists in all of user operation scenario 1, user operation scenario 2, and user operation scenario 4.

The first calculation unit 3032 is configured to add, when a same churn factor exists under at least two of the multiple user scenarios determined by the determining unit 3031, proportions of churned users under each of the at least two user scenarios in all the churned users, to obtain an influence weight value of the same churn factor. Specifically, for example, if a churn factor of a low novice map KD exists in all of user operation scenario 1, user operation scenario 2, and user operation scenario 3, a proportion of churned users of user operation scenario 1 in all the churned users is 30%, a proportion of churned users of user operation scenario 2 in all the churned users is 15%, and a proportion of churned users of user operation scenario 3 in all the churned users is 5%, an influence weight value of the churn factor of a low novice map KD ratio is a value obtained after adding the proportion of the churned users of user operation scenario 1 in all the churned users, the proportion of the churned users of user operation scenario 2 in all the churned users, and the proportion of the churned users of user operation scenario 3 in all the churned users, that is, 30%+15%+5%, equal to 50%. For another example, a churn factor of a high map failure rate exists in both user-frequently used map 1 and user-frequently used map 3 of user operation scenario 1, and a churn factor of a high map failure rate also exists in user-frequently used map 2 of user operation scenario 3, so that an influence weight value of the churn factor of a high map failure rate is 30%+30%+5%, equal to 65%.

The second calculation unit 3033 is configured to determine, when the determining unit 3031 determines that a same churn factor does not exist under the multiple user scenarios, a proportion of churned users under a user scenario to which a churn factor that exists uniquely under the multiple user scenarios belongs in all the churned users as an influence weight value of the churn factor that exists uniquely. In other words, if the churn factor exists under a unique one of the multiple user operation scenarios, a proportion of churned users under the unique one of the multiple user operation scenarios in all the churned users is determined as an influence weight value of the churn factor. Specifically, for example, a churn factor of a small map experience number exists only in user operation scenario 1, a churn factor of a small map experience number does not exist under other user operation scenarios, and a proportion of churned users of user operation scenario 1 in all the churned users is 30%, so that the influence weight value of the churn factor is 30%.

In the system for mining a churn factor causing user churn for a network application provided in FIG. 4, related features of user-frequently used maps of major operation scenarios where user churn occurs may be analyzed, to determine related churn factors, and proportions of churned users under user scenarios to which each churn factor in a same churn factor belongs in all the churned users are added, to obtain an influence weight value of the churn factor, so as to determine a final major churn factor. Therefore, clustering analysis may be performed on users on the basis of stream data of a network application. Such clustering analysis of specific operation scenarios for users can mine detailed problems in specific aspects such as design defects of submodules of a network application, and a concept of a meta-algorithm such as boosting is applied in the process of clustering analysis, so that the speed and accuracy of mining a churn factor causing user churn for a network application may be greatly improved.

Figure 5:
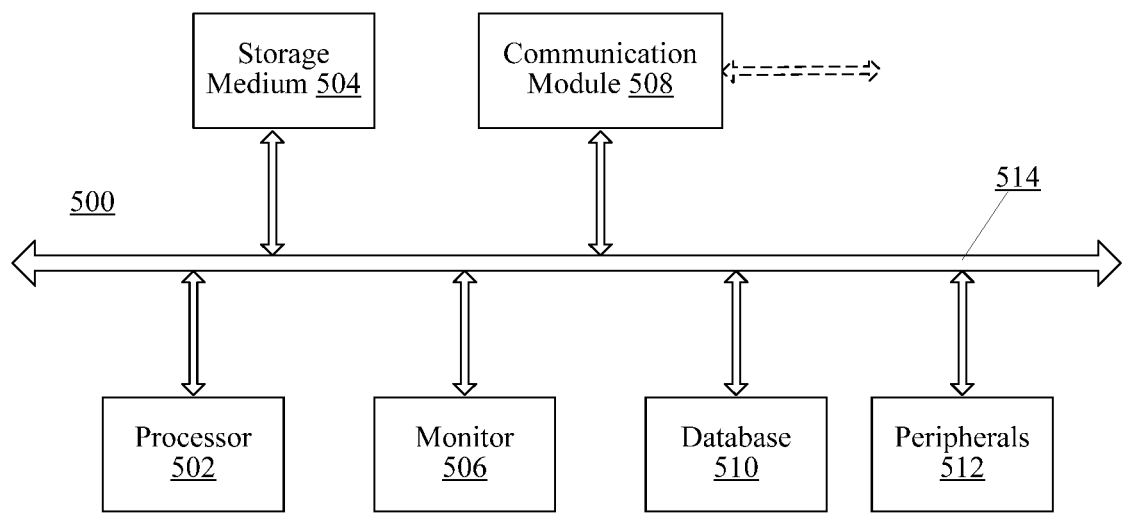
FIG. 5 illustrates a block diagram of an exemplary computer system consistent with the disclosed embodiments.

The computing device, user terminal, server, and/or various modules and units may be implemented using one or more computing systems. FIG. 5 illustrates an exemplary computing system.

As shown in FIG. 5, a computing system 500 may include a processor 502, a storage medium 504, a monitor 506, a communication module 508, a database 510, peripherals 512, and one or more bus 514 to couple the devices together. Certain devices may be omitted and other devices may be included.

The processor 502 can include any appropriate processor or processors. Further, the processor 502 can include multiple cores for multi-thread or parallel processing. The storage medium 504 may include memory modules, e.g., Read-Only Memory (ROM), Random Access Memory (RAM), and flash memory modules, and mass storages, e.g., CD-ROM, U-disk, removable hard disk, etc. The storage medium 504 may store computer programs for implementing various processes (e.g., running a network application, collecting data set from a plurality of users, analyzing the collected data set, etc.), when executed by the processor 502.

The monitor 506 may include display devices for displaying contents in the computing system 500, e.g. displaying, on a user interface, a churn factor determined by implementing the disclosed method. The peripherals 512 may include I/O devices, e.g., touchscreen, keyboard and mouse for inputting information by a user. The peripherals may also include certain sensors, such as gravity sensors, acceleration sensors, and other types of sensors.

Further, the communication module 508 may include network devices for establishing connections through a communication network such as Internet or other types of computer networks or telecommunication networks, either wired or wireless. The database 510 may include one or more databases for storing certain data and for performing certain operations on the stored data.

In operation, the network application may be a program installed on a user terminal with network communication capabilities. The network application may record user activities and send the user activities to a server. The server may host and facilitate certain functionalities of network applications of a plurality of users. The server may collect user activities from all user terminals associated with the network application and thereby establish a complete data set of churned users and non-churned users. When the complete data set is obtained, the server or the computing device may implement the disclosed method for mining a churn factor. Further, the server may periodically update the data set of churned users, and the server and/or the computing device may implement the disclosed method for mining the churn factor based on the updated data. In some embodiments, the server and/or the computing device may include a user interface for the network application provider/developer to configure data mining settings, to display data set and statistics, and to present churn factor analysis results. For example, the network application provider/developer may query information from the data set, input the threshold of the influence weight value and/or the threshold of the fluctuation rate, select features to be analyzed in the data mining process, etc.

More particularly, for example, the server may obtain a data set of churned users; calculate a proportion of a quantity of churned users under each user operation scenario where user churn occurs for the network application in a total quantity of the churned users; determine multiple user operation scenarios corresponding to multiple proportions sequentially placed in foremost positions in a list of all calculated proportions of user operation scenarios ranked in a descending order; determine churn factors of the multiple user operation scenarios, each of the multiple user operation scenarios is associated with at least one churn factor; determine influence weight values of the churn factors; and when an influence weight value of a churn factor is greater than or equal to a threshold, determine that the churn factor is a major churn factor.

It is understood that, a gaming application is merely one implementation example of the disclosed method and device. The disclosed method for mining a churn factor may be used in any proper types of network applications, such as shopping and booking application, reading application, communication application, social network application, financial management application, health and sports application, productivity application, transportation application, etc. For example, in a shopping application, the user operation scenarios may include browsing mode, payment mode, communication mode for contacting sellers and/or friends, etc. The map feature baseline model of non-churned users may include features such as browse/buy rate, item click rate, etc.

The steps in the methods in the embodiments of the present invention may be adjusted in order, combined, and deleted according to an actual need. The modules or units in the apparatuses in the embodiments of the present invention may be combined, classified, and deleted according to an actual need.

The method and the system for mining a churn factor causing user churn for a network application disclosed in the embodiments of the present invention are described in detail above. The principle and implementation of the present invention are described herein through specific examples. The description about the embodiments of the present invention is merely provided for ease of understanding of the method and core ideas of the present invention. Persons of ordinary skill in the art can make variations and modifications to the present invention in terms of the specific implementations and application scopes according to the ideas of the present invention. Therefore, the specification shall not be construed as a limit to the present invention.

What is claimed is:

1. A method for mining a churn factor causing user churn for a network application, executed by a system including a processor and a memory, the method comprising:
   obtaining a computing device including a memory and a processor coupled to the memory;
   acquiring, by the processor, a data set of churned users, the churned users each being a user who has not been active with the network application for a time period and/or a user terminal that has uninstalled the network application;
   calculating, by the processor and according to the data set of the churned users, a percentage of churned users under each of a plurality of user operation scenarios relative to total churned users of the network application;

selecting, by the processor, a top N number of the plurality of user operation scenarios according to a descending order in the percentage of churned users under each of the plurality of user operation scenarios relative to the total churned users;

identifying, by the processor, a churn factor associated with each of the top N number of the plurality of user operation scenarios;

determining, by the processor and according to the percentage of churned users under each of the plurality of user operation scenarios relative to the total churned users, a weight value of the churn factor; and when the weight value of the churn factor is greater than or equal to a threshold, determining, by the processor, that the churn factor is one of major churn factors, wherein finding the churn factor as one of the major churn factors using the top N number of the plurality of user operation scenarios helps identify root causes of churn and improve network application performance optimization.

2. The method according to claim 1, further comprising: predetermining the threshold of the weight value.

3. The method according to claim 1, the method further comprising:
calculating a sum of percentages of churned users under each of the top N number of the plurality of user operation scenarios relative to the total churned users; and
determining if the sum of the percentages is greater than or equal to a predetermined value.

4. The method according to claim 1, wherein identifying the churn factor includes:
acquiring a statistical value of a feature affecting user churn in user-frequently used maps under the plurality of user operation scenarios;
comparing the statistical value of the feature affecting user churn with a baseline value of non-churned users; and
determining, if a fluctuation rate of the statistical value of the feature relative to the baseline value is greater than or equal to a preset value, that the feature is the churn factor.

5. The method according to claim 4, wherein the user-frequently used maps are part of the top N number of the plurality of user operation scenarios.

6. A system for mining a churn factor causing user churn for a network application, comprising a memory and a processor coupled to the memory, the processor being configured to:
calculate, according to a data set of churned users, the churned users each being a user who has not been active with the network application for a time period and/or a user terminal that has uninstalled the network application, a percentage of churned users under each of a plurality of user operation scenarios relative to total churned users of the network application;
select a top N number of the plurality of user operation scenarios according to a descending order in the percentage of the churned users under each of the plurality of user operation scenarios relative to the total churned users;
identify a churn factor associated with each of the plurality of user operation scenarios;

determine, according to the percentage of the churned users under each of the plurality of user operation scenarios relative to the total churned users of the network application a weight value of the churn factors; and determine, when the weight value of the churn factor is greater than or equal to a threshold, that the churn factor is one of major churn factors, wherein finding the churn factor as one of the major churn factors using the top N number of the plurality of user operation scenarios helps identify root causes of churn and improve network application performance optimization.

7. The system according to claim 6, wherein the processor is further configured to:
predetermine the threshold of the weight value of the churn factor.

8. The system according to claim 6, wherein the processor is further configured to:
calculate a sum of percentages of churned users under each of the top N number of the plurality of user operation scenarios relative to the total churned users; and
determine if the sum of the percentages is greater than or equal to a predetermined value.

9. The system according to claim 6, wherein the processor is further configured to:
acquire a statistical value of a feature affecting user churn in user-frequently used maps under the plurality of user operation scenarios;
compare the statistical value of the feature with a baseline value of a corresponding feature of non-churned users; and
if a fluctuation rate of the statistical value of the feature relative to the baseline value is greater than or equal to a preset value, that the feature is the churn factor.

10. The system according to claim 9, wherein the user-frequently used maps are part of the top N number of the plurality of user operation scenarios.

11. A non-transitory computer readable storage medium having stored therein one or more instructions, which, when executed by a computing device, cause the computing device to:
acquire, by the computing device, a data set of churned users, the churned users each being a user who has not been active with the network application for a time period and/or a user terminal that has uninstalled the network application;
calculate, by the computing device and according to the data set of churned users, a percentage of churned users under each of a plurality of user operation scenarios relative to total churned users of the network application;
select, by the computing device, a top N number of the plurality of user operation scenarios according to a descending order in the percentage of the churned users under each of the plurality of user operation scenarios relative to the total churned users;
identify, by the computing device, a churn factor associated with each of the top N number of the plurality of user operation scenarios;
determine, by the computing device and according to the percentage of the churned users under each of the plurality of user operation scenarios relative to the total churned users, a weight value of the churn factor; and
when the weight value of the churn factor is greater than or equal to a threshold, determine, by the computing device, that the churn factor is one of major churn factors, wherein finding the churn factor as one of the major churn factors using the top N number of the plurality of user operation scenarios helps identify root causes of churn and improve network application performance optimization.

12. The non-transitory computer readable storage medium according to claim 11, wherein the computing device is further configured to:
predetermine the threshold of the weight value.

13. The non-transitory computer readable storage medium according to claim 11, wherein the computing device is further configured to:
calculate a sum of percentages of churned users under each of the top N number of the plurality of user operation scenarios relative to the total churned users; and
determine if the sum of the percentages is greater than or equal to a predetermined value.

14. The non-transitory computer readable storage medium according to claim 11, wherein the computing device is further configured to:
acquire a statistical value of a feature affecting user churn in user-frequently used maps under the plurality of user operation scenarios;
compare the statistical value of the feature with a baseline value of a corresponding feature of non-churned users; and
determine, if a fluctuation rate of the statistical value of the feature relative to the baseline value is greater than or equal to a preset value, that the feature is the churn factor.

15. The non-transitory computer readable storage medium according to claim 14, wherein the user-frequently used maps are part of the top N number of the plurality of user operation scenarios.

16. The method according to claim 1, wherein the top N number of the plurality of user operation scenarios includes a first user operation scenario of a first percentage and a second user operation scenario of a second percentage, and the weight value of the churn factor is a sum of the first and second percentages.

17. The system according to claim 6, wherein the top N number of the plurality of user operation scenarios includes a first user operation scenario of a first percentage and a second user operation scenario of a second percentage, and the weight value of the churn factor is a sum of the first and second percentages.

18. The non-transitory computer readable storage medium according to claim 11, wherein the top N number of the plurality of user operation scenarios includes a first user operation scenario of a first percentage and a second user operation scenario of a second percentage, and the weight value of the churn factor is a sum of the first and second percentages.

* * * * *